United States Patent
Fiore

[15] 3,691,820
[45] Sept. 19, 1972

[54] CRACK DETECTION METHOD AND SYSTEM THEREFOR

[72] Inventor: John Fiore, Oyster Bay, N.Y.
[73] Assignee: Rex Chainbelt Inc.
[22] Filed: May 20, 1970
[21] Appl. No.: 39,137

[52] U.S. Cl..................................73/40.7, 416/61
[51] Int. Cl..................................G01m 3/20
[58] Field of Search.........73/40.7, 40, 37, 49.2, 49.3, 73/52, 38; 416/61

[56] References Cited

UNITED STATES PATENTS

| | | | |
|---|---|---|---|
| 2,486,199 | 10/1949 | Nier | 73/40.7 |
| 2,346,423 | 4/1944 | Gray | 73/40 |

Primary Examiner—Louis R. Prince
Assistant Examiner—William A. Henry, II
Attorney—Edward W. Mentzer

[57] ABSTRACT

A method and system for detecting a crack in a wall of a closed hollow vessel, such as a helicopter blade, filled with a non-contaminated referee medium, such as a pure gas. Means, such as a chemical absorbent direct reading detector, are provided for detecting the presence of a contaminant, such as a gaseous impurity, in the non-contaminated referee medium, the contaminant being introduced into the referee medium upon the appearance of a crack. For composite vessels which are composed of at least two layers, or walls, held together by a bonding material, a crack in the inner wall is detected due to the presence of a gaseous contaminant, such as ammonia, outgassed from the bonding material. For detection of a crack in a wall of a vessel having only a single layer, means are provided for dynamically introducing a pressure differential on opposite sides of the wall for introducing the contaminant into the referee medium upon the appearance of the crack.

20 Claims, 6 Drawing Figures

PATENTED SEP 19 1972  3,691,820
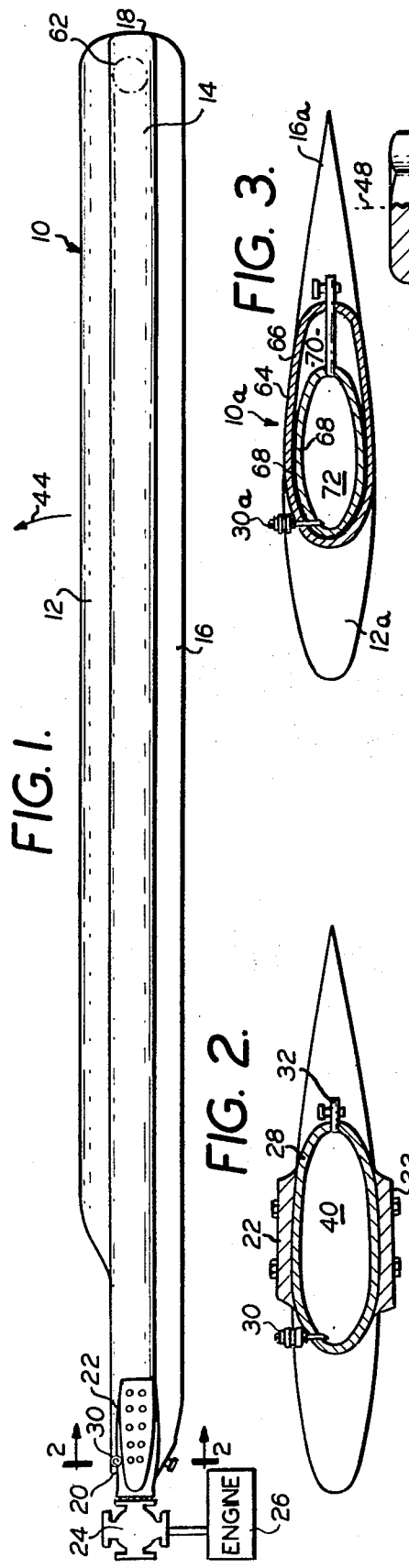
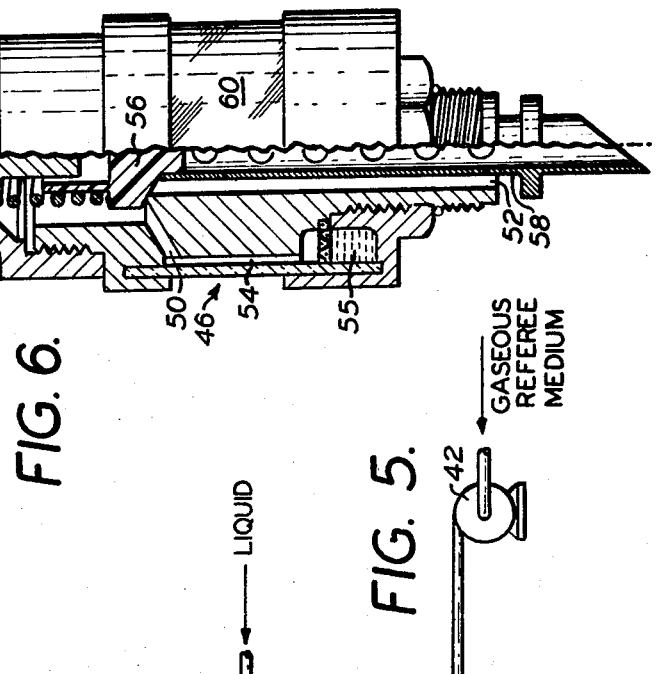
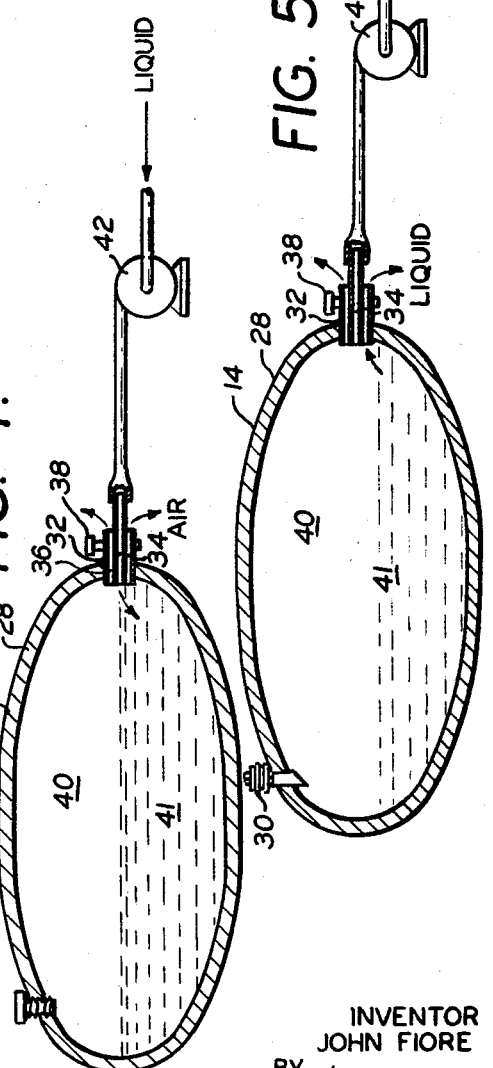
INVENTOR
JOHN FIORE
BY Hubbell, Cohen & Stiefel
ATTORNEYS

CRACK DETECTION METHOD AND SYSTEM THEREFOR

BACKGROUND OF THE INVENTION

1. Field of the Invention

The present invention relates to crack detection and more particularly to a method and system for detecting a crack in a wall of a closed hollow vessel filled with a non-contaminated referee medium by detection of the presence of a contaminant therein.

2. Description of the Prior Art

Prior art systems for detecting a crack in a wall of a closed hollow vessel have primarily been confined to pressurizing the interior of the hollow vessel to a pressure greater than ambient and monitoring, or detecting, for a pressure reduction in the interior of the vessel due to leakage of the pressurized gas through a crack. However, when the hollow vessel is a composite structure comprising more than one surrounding layer, or wall, a crack in the inner wall cannot be detected by this method if there is no crack in the outer wall, as no leakage will occur from the interior of the vessel through the crack which crack is effectively sealed to the surrounding environment by the outer wall. If the composite structure consists of an inner wall of metal and an outer surrounding wall of fiberglass, such as is common in composite helicopter blades, it is important that failures, or cracks in the inner wall which can result in failure of the blade, be detected.

Other prior art crack detection systems have involved filling a chamber with a gas and then creating a controlled vacuum by the use of a vacuum pump, within the chamber, so as to detect the presence of a gaseous impurity within the chamber. Still other prior art systems have involved pressurizing a gas within an inner chamber and pressurizing another gas within an outer chamber surrounding the inner chamber and detecting for the presence of the gas in one chamber entering the other chamber. Both these last mentioned types of prior art systems rely on a statically induced pressure differential and require external means, such as a vacuum pump, to apply this static pressure differential. In certain instances, it is desirable to detect for cracks under dynamic loading conditions rather than static conditions, such as in a helicopter blade where the dynamic loading conditions, which are the conditions due to the loading and unloading of the blade as it revolves, provide a vibratory type loading characteristic which introduces fatigue in the blade which may ultimately lead to failure of the blade due to cracking. Therefore, in such instances as this, it is desirable to detect for cracks in the hollow vessel, or in this instance helicopter blade, during normal use and conventional static detection means requiring additional equipment, such as the vacuum pump, which are normally not readily available out in the field as well as being impractical for dynamic tests due to the fact that they provide a static pressure differential rather than a dynamic pressure differential, are not satisfactory. Furthermore, none of the prior art crack detection systems are capable of detecting for a crack in the inner wall of a composite hollow vessel.

SUMMARY OF THE INVENTION

The system for detecting a crack in a wall of a closed hollow vessel filled with a non-contaminated referee medium includes means for dynamically introducing a pressure differential on opposite sides of the wall for introducing a contaminant into the referee medium upon the appearance of the crack. Means are also provided for detecting the presence of the contaminant in the non-contaminated referee medium. The referee medium is substantially at atmospheric pressure. In performing the method of the present invention the interior of the vessel is filled with the non-contaminant referee medium substantially at atmospheric pressure; the contaminant is introduced into the referee medium upon the appearance of the crack; and the presence of the contaminant in the referee medium is detected.

BRIEF DESCRIPTION OF THE DRAWING

FIG. 1 is a plan view of a helicopter blade employing the detection system of the present invention;

FIG. 2 is a sectional view of the embodiment shown in FIG. 1 taken along line 2—2;

FIG. 3 is a view similar to FIG. 2 showing an alternative embodiment of a helicopter blade employing the detection system of the present invention;

FIGS. 4 and 5 are diagrammatic views illustrative of preparation steps in the method of the present invention; and FIG. 6 is a view partly in section and partly in elevation of a detector which may be used in performing the method of the present invention.

DETAILED DESCRIPTION OF THE PREFERRED EMBODIMENT

Referring now to the drawings in detail, and particularly to FIG. 1 thereof, a helicopter blade 10 employing the crack detecting system of the present invention is shown by way of illustration. The helicopter blade 10, which is a conventional helicopter blade structure, includes a leading edge faring 12, a central spar member 14 and a trailing edge faring 16. The leading edge faring 12 is the portion of the blade which heads into the wind as the blade 10 is rotated in the direction indicated by the arrow 15. The farings 12 and 16 are usually formed of a honeycomb structure, not shown, surrounded by a fiberglass shell and are bonded to the central spar member 14 as shown in FIGS. 2 and 3. The blade 10 has a tip end 18 and a root end 20. A conventional hub attach, or blade root attach fitting 22 is secured to the blade 10 at the central spar member 14 for attaching the blade 10 at the root end 20 to a central hub 24 so as to be rotated thereby. If desired the hub attach fitting 22 could be formed as part of the blade 10. The hub 24 is connected in a conventional manner through a drive shaft and gear train (not shown), to an engine 26 so as to be driven thereby to rotate the blade 10 in the direction indicated by arrow 15. Clearly, hub 24 is generally attached to more than one blade. However, only one blade 10 is shown by way of illustration.

Referring now to FIGS. 1 and 2, the central spar portion 14 of the blade 10 is preferably hollow and, in the embodiment shown in FIG. 2, comprises only a single surrounding wall 28, which is preferably formed of metal, whose shape is illustratively shown as being elliptical. Under normal conditions of use the central spar portion 14 of the blade 10, which is the structural portion thereof, has its interior completely sealed from the surrounding environment due to the surrounding wall 28 being a closed wall. In the crack detection system of the present invention surrounding wall 28 has a crack detection contaminant sensor, or detector 30 passing therethrough so as to have a portion thereof in communication with the interior of the hollow spar 14, and a purge and vent valve 32 also passing through wall 28 for preparing the interior of the hollow spar 14 in accordance with the method of the present invention in a manner to be described in greater detail hereinafter.

Referring now to FIGS. 4 and 5 which illustrate the functioning of the purge and vent valve 32 in accordance with the preferred method of the present invention, the purge and vent valve 32 preferably includes a pair of concentric cylindrical members forming an inner purge chamber 34 and an outer vent chamber 36, and further includes a locking means 38 for sealing and opening the chambers 34 and 36 of the valve 32 to the surrounding environment.

In performing the method of the present invention, the inlet to the valve 32, which is the inlet to the purge chamber 34, is connected to a source of a non-corrosive liquid 39, such as carbon tetrachloride if the wall 28 is metal. The liquid 39 is pumped into the interior 40 of the hollow spar 14 preferably by means of a pump 42, so as to fill completely the interior 40 of the hollow spar or vessel 14. The liquid 39 thereby purges any air or other gaseous contaminant out through valve 32 via vent chamber 36 to the surrounding environment.

When the interior 40 is filled with the liquid 39, the valve 32 is closed by means of locking means 38. The contaminant detector 30, which will be described in greater detail hereinafter, is then preferably inserted through the surrounding wall 28 so as to be in communication with the interior 40 of the hollow spar 14. The pump 42 is then connected to a source of a non-contaminated referee medium, which medium 43 is a substance not containing the substance whose presence is to be detected for. The pump 42 still remains connected to the inlet to the purge chamber 34 of the valve 32. The valve 32 is then unlocked so as to permit the passage of the referee medium 43 therethrough into the interior 40 of the hollow spar 14 and the venting of the non-corrosive liquid 39 contained therein through venting chamber 36 to the surrounding environment until preferably all of the liquid 39 is purged out of the interior 40 of the hollow spar 14.

When all the liquid 39 is purged from the interior 40, the valve 32 is closed, and the referee medium 43 supply, not shown, is disconnected from the valve 32 inlet. Preferably, although not necessarily, the pressure of the referee medium 43, which is preferably a purge gas which is a gas not containing the impurity or contaminant to be detected, such as nitrogen ($N_2$) if oxygen ($O_2$) is the contaminant to be detected, is at atmospheric pressure which is defined as the pressure of the atmosphere at the point of preparation of the blade 10 for the crack detection method of the present invention. If the gaseous referee medium 43 is not at this pressure then, preferably prior to the disconnection of the referee medium 43 source from the valve 32, the pressure of the referee medium 43 is allowed to decay through the supply line vent valve (not shown) until it is at the desired atmospheric pressure, or, as will be mentioned subsequently, even lower. The purge and vent valve 32 is then locked and the supply line disconnected. The interior 40 of the hollow spar 14 is now prepared to detect the occurrence of any cracks in the surrounding wall 28.

In performing the method of the present invention, which enables the detection of cracks in a hollow vessel under dynamic conditions, the blade 10 is rotated, such as in normal use, in the direction indicated by the arrow 15 in FIG. 1, by means of the engine 26 and hub 24. The rotation of the blade 10 dynamically induces a pressure differential on opposite sides of the blade 10 as well as on opposite sides of the surrounding wall 28 due to this rotation. This phenomenon is a result of the application of the well known aerodynamic principle that air passing over a cambered blade 10 decreases in pressure along the length of the flow path over the blade 10 to less than static ambient pressure. It is also well known that in order to obtain aerodynamic lift, the upper air flow path of the blade 10 should be longer than the lower air flow path of the blade 10 so that the pressure on the lower portion of the blade 10 will be greater than the pressure on the upper portion of the blade 10.

Furthermore, since the referee medium 43 in the interior 40 of the spar 14 is at static atmospheric pressure, there is a pressure differential between the interior 40 of the blade 10 and the exterior of the blade 10 due to the reduction in pressure along the air flow paths of the blade 10 to less than the static ambient pressure. This would be true even if the blade 10 is not rotated but rather has a stream of air directed over the blade 10 from an external source (not shown). If a crack, not shown, appears in the spar member 14 of the surrounding wall 28, then the dynamically induced pressure differential will cause the gaseous referee medium 43 to flow out from the interior 40 through the crack in the wall 28 to the surrounding environment. This outflow lowers the pressure of the interior 40 of the spar 14 until equilibrium occurs and the interior 40 is at the pressure of the surrounding environment. When the pressure of the surrounding environment is increased, either prior to, or after equilibrium occurs, such as by ceasing the air flow over the blade 19 so as to return the pressure of the surrounding environment along the previous air flow to ambient, which is now higher than the pressure of the spar interior 40, the surrounding environment which contains the contaminant, or substance to be detected for, therein will enter the interior 40 of the spar 14 through the crack due to the dynamically induced pressure differential.

When the contaminant enters the interior 40 of the hollow vessel or spar 14, contaminant detector 30 provides an indication of its presence. This detector indication to an observer is an indication that there is a crack in the wall 28 which, in the illustrative example of the helicopter blade 10, is a critical indication to the observer that the blade 10 must be replaced before failure occurs due to metal fatigue.

A pressure differential is also induced dynamically on opposite sides of the surrounding wall 28 by means of a flexing action on the hollow vessel, or spar 14 due to dynamic loading conditions which occur during normal use and which create a pumping or mixing action, at a crack in the surrounding wall 28. If desired this dynamic loading condition could be introduced artificially on the blade 10. The dynamic load which is provided on blade 10 as it rotates provides a vibratory type loading characteristic for the helicopter blade 10. This vibratory characteristic is due to the rotating helicopter blade 10, which is ordinarily hinged to the hub 24, having its tip end 18 forced outward due to centrifugal force which tends to pull the tip end 18 of the blade 10 outward as the blade 10 rotates thereby causing the flexing of the blade 10. This flexing, or vibration of the helicopter blade 10 causes the crack in the surrounding wall 28 to fibrillate thereby providing the pumping and mixing action at the crack which exhausts the referee medium 43 and intakes a gaseous contaminant. The sensitivity of the detector 30 is preferably chosen so as to be responsive to the presence of a relatively small quantity of the selected contaminant so that the contaminant need only be a small portion of the surrounding environment and need be a substantial percentage of the composition of this environment.

Furthermore, changes in altitude to an altitude having an ambient pressure different that the pressure of the gaseous referee medium 43 in the interior 40 of the spar 14, also dynamically induces a pressure differential on opposite sides of the wall 28. For example, as the blade 10 rises in altitude, the pressure of the surrounding environment decreases and the referee medium 43 will be exhausted to the surrounding environment, thereby decreasing the pressure of the interior 40 of the spar 14 towards that of the surrounding environment at that altitude. When the blade 10 is thereafter lowered in altitude the pressure of the surrounding environment increases to a value greater than the dynamically induced pressure differential of the interior 40 and the surrounding environment which contains the contaminant enters the interior 40 of the spar 14 through the crack.

The dynamically induced pressure differential can, therefore, be induced either by the normal method of use of the blade 10 or by artificially inducing this pressure differential. Furthermore, if desired, the referee medium 43 could initially be at a pressure substantially lower than atmospheric pressure if it is desired to enhance the pressure differential with the surrounding environment.

Contaminant Detection

Now referring to FIG. 6, a particular type of contaminant detector 46 is shown in detail. In performing the method of the present invention, the contaminant which is detected for may be any substance not contained in the referee medium 43. By way of example, if the gaseous referee medium comprises a pure gas other than oxygen, such as helium or nitrogen, the contaminant detected for could be oxygen. In this instance, the contaminant detector 46 which is shown in detail in FIG. 6, could be utilized in place of the contaminant detector 30 shown in FIGS. 1, 2, 3 and 5. This oxygen contaminant detector 46 is a chemical absorbent direct reading detector similar in principle of operation to a Fyrite oxygen analyzer manufactured by Bacharach. This direct reading detector 46 is a visual readout device which is substantially symmetrical about its central axis 48. The oxygen detector 46 includes a flow port 50, an inlet chamber 52 which is in communication with the flow port 50 during normal operation of the device 46, an expansion chamber 54 which is in communication at one end with the flow port 50 and at the other end with an oxygen absorbent fluid 55 such as sodium hydrosulfite ($Na_2S_2O_4$), and an anti-slosh screen 57 located between the expansion chamber 54 and the fluid 55 so as to prevent accidental sloshing of the fluid 55 into the chamber 54 merely due to rotation of the blade 10 which might thereby provide a false indication.

A spring loaded valve seat 56 is attached to a plunger-like shaft 58. This valve seat 56 seals flow port 50 from inlet chamber 52, as shown in FIG. 6, when the plunger 58 is not depressed. The spring loaded plunger 58 is depressed when the detector 46 is inserted through the wall 28 and threaded into position, due to a protrusion 59 near the base thereof contacting the edges of the wall 28 surrounding the detector entry hole. A flow path through the detector 46 through inlet 52 of port 50 and expansion chamber 54 to the oxygen absorbent fluid 55 is thereby opened. Preferably the point of communication 61 between the inlet chamber 52 and the flow port 50 is higher than the level of the liquid 39 in the interior 40 during the preparation step so that when detector 46 is inserted into the interior 40, the liquid 39 will not enter flow port 50 and will be able to be purged from the interior 40 with the balance of the liquid 39.

The oxygen absorbent fluid 55 preferably expands in volume to ten times the volume of the annulus, or expansion chamber 54 when the fluid 55 absorbs oxygen. A window 60 is provided adjacent the expansion chamber 54 so that the presence of the oxygen absorbent fluid in the chamber 54 can be observed thereby indicating that oxygen is present in the interior 40 of the hollow vessel or spar 14, and a crack in the surrounding wall 28 has, therefore, occurred.

If desired, contaminant detector 30 could be replaced by a detector 62 which detects for the presence of moisture, or water vapor, as the contaminant. In this instance the moisture detector 62, shown in dotted lines in FIG. 1, is preferably located near the tip 18 of the blade 10 rather than the root end 20 thereof in order to take advantage of the centrifugal force of the blade 10 driving any moisture present in the interior 40 toward the tip 18 of the blade. Furthermore, in this instance the interior 40 would be purged with a dry gas rather than a liquid so as not to leave any traces of a liquid therein which might inadvertently activate the detector 62. By way of example, the moisture detector 62 could comprise a moisture sensitive device such as treated litmus paper which turns acidic and changes color when water vapor is present, or a conventional humidity detector.

In addition, if electrical readout of the presence of a contaminant, such as oxygen, were desired rather than a direct visual readout, such as by a device placed in the cockpit of a helicopter which is in operation, so that the occurrence of a crack in the spar 14 could be immediately detected at the time of occurrence, a self-generating, electrolytic type oxygen detector similar to a Bacharach Type Model K Gas Analyzer or a Beckman Model 715 Process Oxygen Monitor, could be utilized in place of contaminant detector 30. In this instance, the detector is connected in a series circuit (not shown) with a relay, a brushless generator source comprising a winding about the hub 24 and a magnet located at the root end 20 of each blade 10, and an electrically actuated indicator located in the cockpit. As the blade 10 rotates, an electric field is generated. When oxygen is present in the interior 40 of the spar 14 a current is produced by the analyzer, which current completes the circuit thereby actuating the indicator.

Detection in Composite Structures

Referring now to FIG. 3, the method of the present invention can also be performed on composite structures including more than one surrounding wall to detect for cracks in either or both surrounding walls. The embodiment shown in FIG. 3 represents a composite helicopter blade 10a having a leading edge faring 12a and a trailing edge faring 16a, similar in structure to farings 12 and 16 of the embodiment shown in FIG. 1, and a central composite hollow spar portion 64. Composite spar 64 has an outer surrounding wall 66 which is illustrated as being generally elliptical, and an inner surrounding wall 68 which is also illustrated as being elliptical but preferably not concentric with the outer surrounding wall 66 so as to create two hollow chambers 70 and 72. Hollow chamber 70 preferably has a single thickness surrounding wall partially consisting of outer wall 66 and partially consisting of inner wall 68, and hollow chamber 72 preferably has a portion consisting of a double thickness surrounding wall comprised of outer wall 66 and inner wall 68 and another portion consisting of only a single thickness surrounding wall comprised of inner wall 68.

For purposes of illustration, we shall discuss the method of the present invention in detecting for a crack in the hollow chamber 72. The outer wall 66 is bonded to the inner wall 68 preferably along the entire periphery, or outer surface, of inner wall 68 which contacts the inner surface of wall 66, illustratively shown by a line 68 whose thickness is exaggerated. Preferably, the bonding material 68 is composed of a material which has the capability of outgassing, or emitting a gas therefrom, during normal use. Such a material is an epoxy resin-amine condensate which outgasses gaseous ammonia ($NH_3$).

In this instance, the contaminant which is to be detected is the gaseous impurity outgassed from the bonding material 68, which, for the example chosen, is gaseous ammonia. Under normal conditions the gaseous contaminant is confined in the region outside the hollow chamber 72. However, if a crack occurs in the inner surrounding wall 68 then the outgassed contaminant will enter the hollow interior 72 due to an inherent difference in partial pressures between the non-contaminated referee medium and the contaminant, and its presence will be detected by contaminant detector 30a which has been inserted through surrounding walls 66 and 68 so as to be in communication with the hollow interior 72. Preferably the contaminant detector 30a is capable of detecting for the presence of a contaminant which is present in the surrounding environment of the blade 10a as well as the contaminant which is outgassed from the bonding material 68 so that a crack may be detected in either the outer surrounding wall 66 or the inner surrounding wall 68. The hollow interior 72 of the composite spar portion 64 is filled with the gaseous referee medium in substantially the same manner as described with reference to the single wall embodiment of FIG. 2, although in this instance the referee medium is substantially pressure independent due to the inherent partial pressure differential. In this manner a crack will be detected in the inner wall 68 even if no crack occurs in the outer wall 66, due to the introduction of the gaseous contaminant into the hollow interior 72.

By utilizing the method of the present invention and the system for performing this method, fatigue failures, such as those which are due to the normal use of a hollow member of either a single wall or composite (more than one wall) variety can be detected under dynamic operating conditions, such as during normal use, as well as static conditions so as to provide the earliest possible warning of potential failure due to the occurrence of a crack in an accurate, efficient and economical nondestructive test format.

As used herein throughout the specification and the claims the term "hollow" is defined as including anything other than a solid homogeneous structure throughout; and the term "atmospheric pressure" is defined as air pressure at the point of preparation of the hollow vessel for detection, which is the point at which the referee medium is introduced into the hollow interior and filled therewith.

It is to be understood that the above described embodiments of the present invention are merely illustrative thereof and that numerous modifications and embodiments of the invention may be derived within the spirit and scope thereof.

What is claimed is:

1. A system for detecting a crack in a wall of a closed hollow vessel filled with a non-contaminated referee medium comprising:
   means for dynamically inducing a lower pressure on the outside of said wall for causing the emission of a portion of said referee medium upon the appearance of said crack; and
   means for introducing a contaminant through said crack into said non-contaminated referee medium upon removal of the dynamically induced lower pressure, and means for detecting the presence of said contaminant in said non contaminated reference medium.

2. A system in accordance with claim 1 wherein said referee medium is at atmospheric pressure.

3. A system in accordance with claim 1, wherein said referee medium is a pure gas.

4. A system in accordance with claim 1, wherein said contaminant is a gaseous impurity.

5. A system in accordance with claim 1, wherein said contaminant is water vapor.

6. A system for detecting a crack in a wall of a closed hollow vessel comprising:
   a non-contaminated referee medium within the interior of said vessel, said hollow vessel having an outer wall surrounding said wall, said wall being an inner wall, said inner wall and said outer wall each having an opposing side;
   a bonding material located between said opposing sides for bonding said sides together, said bonding material being capable of outgassing a contaminant therefrom; and means for detecting the presence of said contaminant in said non-contaminated referee medium, said contaminant being introduced into said referee medium upon the appearance of said crack.

7. A system in accordance with claim 6, wherein said referee medium is substantially at atmospheric pressure.

8. A system in accordance with claim 6, wherein said contaminant is gaseous ammonia.

9. A method for detecting a crack in a wall of a closed hollow vessel having an inner wall and an outer surrounding wall bonded together by a bonding material capable of outgassing a contaminant therefrom, comprising the steps of:
   filling the interior of said vessel with a non-contaminated referee medium,
   said contaminant being introduced into said referee medium upon the appearance of a crack; and
   detecting the presence of said contaminant in said referee medium.

10. A method in accordance with claim 9, wherein said referee medium is at substantially atmospheric pressure.

11. A method for detecting a crack in a wall of a closed hollow vessel filled with a referee medium comprising the steps of:
   inducing dynamically a lower pressure on the outside of said vessel such that a portion of said referee medium is emitted upon the appearance of said crack,
   removing the dynamically induced lower pressure such that a contaminant is introduced through said crack into said referee medium, and
   detecting the presence of said contaminant in said referee medium.

12. A method in accordance with claim 11, wherein the introducing step includes the step of dynamically inducing said pressure differential by applying a dynamic load to said wall.

13. A method in accordance with claim 11 including the additional steps of filling the interior of said vessel with a liquid, then
   purging said liquid from the interior of the vessel by filling said interior with said referee medium.

14. A method in accordance with claim 13 wherein said referee medium is a gas.

15. A method in accordance with claim 13 wherein said filling step includes the additional step of bleeding said referee medium substantially to atmospheric pressure after said purging.

16. A method in accordance with claim 13 wherein said referee medium is at substantially atmospheric pressure.

17. A method in accordance with claim 11 wherein said detecting step includes the step of visually indicating the presence of said contaminant.

18. A method in accordance with claim 11 wherein said detecting step includes the step of detecting a gaseous impurity as said contaminant.

19. In a closed hollow aircraft rotor blade filled with a non-contaminated referee medium, a device for detecting a crack in the wall of said blade comprising, a housing containing a contaminant detecting substance normally closed to entry of the contaminant, attachment means on said housing for mounting the device in the blade wall such that a portion of said housing is in communication with the interior of the blade, valve means in said housing operable to open said housing to communication with the interior of the blade whereby a contaminant entering the blade through a crack in the wall thereof has direct communication with said detecting substance, and indicating means integral with said housing to indicate the presence of the contaminant.

20. A device as defined in claim 19 wherein said valve means is actuated by said attachment means and opened concurrently with the mounting thereof in the blade wall.

* * * * *